(12) United States Patent
Gutmann et al.

(10) Patent No.: US 7,712,766 B2
(45) Date of Patent: May 11, 2010

(54) SIDE AIRBAG

(75) Inventors: Ralf Gutmann, Ulm (DE); Rainer Heuschmid, Ulm (DE); Robert Getz, Ulm (DE); Thomas Sievers, Ulm-Lehr (DE); Holger Rist, Dornstadt (DE)

(73) Assignee: Takata-Petri AG, Aschaffenburg (DE)

( * ) Notice: Subject to any disclaimer, the term of this patent is extended or adjusted under 35 U.S.C. 154(b) by 371 days.

(21) Appl. No.: 11/819,714

(22) Filed: Jun. 28, 2007

(65) Prior Publication Data
US 2008/0012271 A1 Jan. 17, 2008

(30) Foreign Application Priority Data
Jun. 29, 2006 (DE) .................. 20 2006 010 362

(51) Int. Cl.
*B60R 21/16* (2006.01)

(52) U.S. Cl. ............... 280/728.2; 280/729; 280/730.2; 280/743.2

(58) Field of Classification Search ............ 280/728.2, 280/730.2, 743.1, 743.2, 729
See application file for complete search history.

(56) References Cited

U.S. PATENT DOCUMENTS

| | | | | |
|---|---|---|---|---|
| 5,308,113 | A * | 5/1994 | Moriset .................. | 280/743.2 |
| 5,636,862 | A | 6/1997 | Cheung et al. | |
| 6,010,149 | A | 1/2000 | Riedel et al. | |
| 6,073,959 | A | 6/2000 | Heinz et al. | |
| 6,203,058 | B1 * | 3/2001 | Elqadah et al. ......... | 280/730.2 |
| 6,241,277 | B1 | 6/2001 | Heigl et al. | |
| 6,315,323 | B1 | 11/2001 | Pack, Jr. | |
| 6,375,216 | B1 | 4/2002 | Eschbach | |
| 6,390,501 | B1 | 5/2002 | Greib et al. | |
| 6,709,008 | B2 | 3/2004 | McGee et al. | |
| 6,736,426 | B2 | 5/2004 | Winters et al. | |
| 6,848,708 | B2 | 2/2005 | Green et al. | |
| 6,880,666 | B2 | 4/2005 | Kikuchi et al. | |
| 6,896,288 | B2 * | 5/2005 | Tanaka et al. ............ | 280/743.2 |
| 6,913,283 | B2 | 7/2005 | Heym | |
| 6,994,371 | B2 | 2/2006 | Bossecker et al. | |
| 7,128,338 | B2 * | 10/2006 | Gorecki et al. ........... | 280/743.1 |
| 7,434,831 | B2 * | 10/2008 | Noguchi et al. .......... | 280/730.2 |
| 2002/0084630 | A1 | 7/2002 | Aulbach | |
| 2004/0140653 | A1 | 7/2004 | Bossecker et al. | |
| 2005/0057030 | A1 | 3/2005 | Fischer et al. | |
| 2006/0022439 | A1 * | 2/2006 | Bayley et al. ............. | 280/729 |
| 2006/0119083 | A1 | 6/2006 | Peng et al. | |

FOREIGN PATENT DOCUMENTS

| | | |
|---|---|---|
| DE | 196 35 495 A1 | 3/1998 |
| DE | 196 40 322 B4 | 3/1998 |

(Continued)

*Primary Examiner*—Eric Culbreth
(74) *Attorney, Agent, or Firm*—Foley & Lardner LLP

(57) ABSTRACT

A side airbag arrangement for a vehicle occupant restraint system includes an airbag which is provided for the protection of a vehicle occupant and which has at least two inflatable chambers which are in each case to assume a specific position in a motor vehicle after inflation. A functional band is provided, which is secured by a portion outside the airbag. At least a portion of the functional band exerts on at least one of the chambers of the airbag a holding force, which has the effect that the chamber, after inflation, assumes the position provided for the chamber.

35 Claims, 10 Drawing Sheets

FOREIGN PATENT DOCUMENTS

| | | |
|---|---|---|
| DE | 197 81 970 B4 | 7/1999 |
| DE | 198 37 749 B4 | 3/2000 |
| DE | 100 38 853 A1 | 5/2001 |
| DE | 199 83 762 B4 | 11/2001 |
| DE | 100 32 106 A1 | 1/2002 |
| DE | 203 02 050 U1 | 7/2003 |
| DE | 102 29 102 A1 | 1/2004 |
| DE | 102 37 697 A1 | 2/2004 |
| DE | 202 16 596 U1 | 4/2004 |
| DE | 10 2004 044 659 A1 | 6/2005 |
| EP | 1 064 173 B1 | 1/2001 |
| EP | 1 216 895 B1 | 6/2002 |
| EP | 1 350 688 B1 | 10/2003 |
| EP | 1 442 946 A1 | 8/2004 |
| EP | 1 588 907 A1 | 10/2005 |
| GB | 2 322 338 A | 8/1998 |
| WO | WO 97/06987 | 2/1997 |
| WO | WO 98/07598 | 2/1998 |
| WO | WO 99/48728 | 9/1999 |
| WO | WO 00/37287 | 6/2000 |
| WO | WO 01/49535 A1 | 7/2001 |
| WO | WO 02/051670 A1 | 7/2002 |
| WO | WO 02/085674 A2 | 10/2002 |
| WO | WO 2005/000639 A1 | 1/2005 |

\* cited by examiner

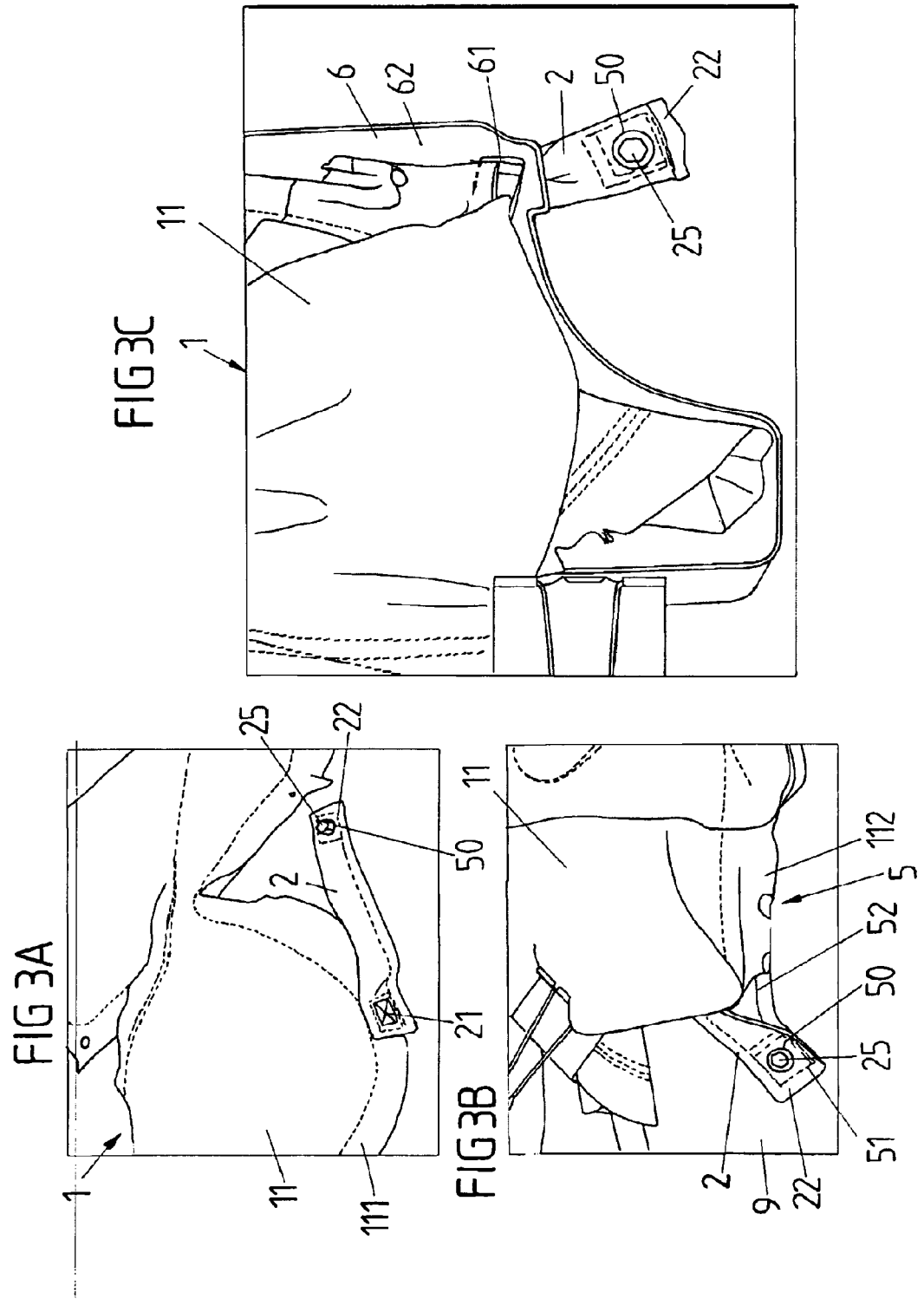

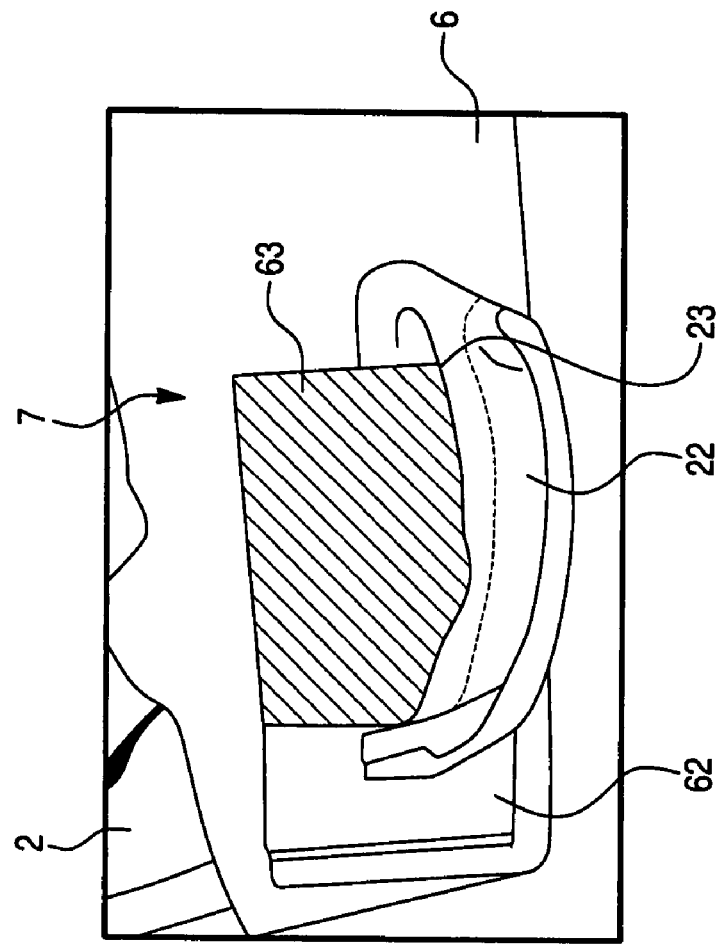
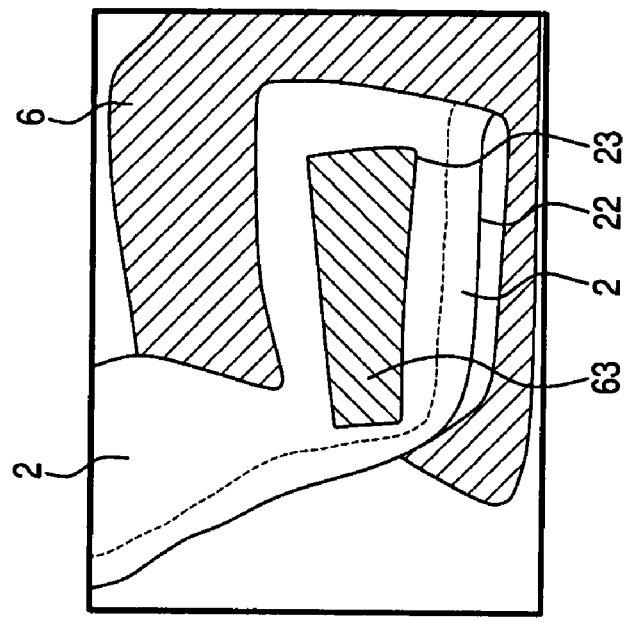
Fig. 6A
Fig. 6B

SIDE AIRBAG

BACKGROUND

The present application relates to a side airbag arrangement for a vehicle occupant restraint system, having an inflatable airbag for the protection of a vehicle occupant, and to a side airbag arrangement.

It is known to provide in a vehicle seat a side airbag which protects a vehicle occupant laterally in the event of an accident. A stabilization of a side airbag of this type during and after deployment can be achieved, using bands consisting of, for example, a textile fabric, which reinforce specific regions of the side airbag or connect various regions of the side airbag to one another.

Where side airbags having a plurality of inflatable chambers are concerned, it is known to connect different chambers of the airbag to one another via bands, in order to position the chambers in relation to one another during and after the deployment of the airbag.

SUMMARY

One disclosed exemplary embodiment relates to a side airbag arrangement for a vehicle occupant restraint system. The side airbag arrangement comprises an airbag which is provided to protect a vehicle occupant, and a functional band. The airbag includes at least two inflatable chambers which are in each case to assume a specific position in a motor vehicle after inflation. The functional band is fastened by a portion outside the airbag. The functional band is configured to exert on at least one of the chambers of the airbag a holding force such that the chamber, after inflation, assumes a predetermined position provided for the chamber.

Another exemplary embodiment relates to a side airbag arrangement for a vehicle occupant restraint system. The side airbag arrangement comprises an inflatable airbag, a functional band, and a holding device for holding a gas generator. The airbag includes at least one connecting structure for the connection of the airbag to the holding device. The connecting structure is provided on the functional band fastened to the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 3A-3C show a first variant of the fastening of the functional band to a vehicle part.

FIGS. 6A and 6B show a fourth fastening variant.

DETAILED DESCRIPTION

Figure 1:
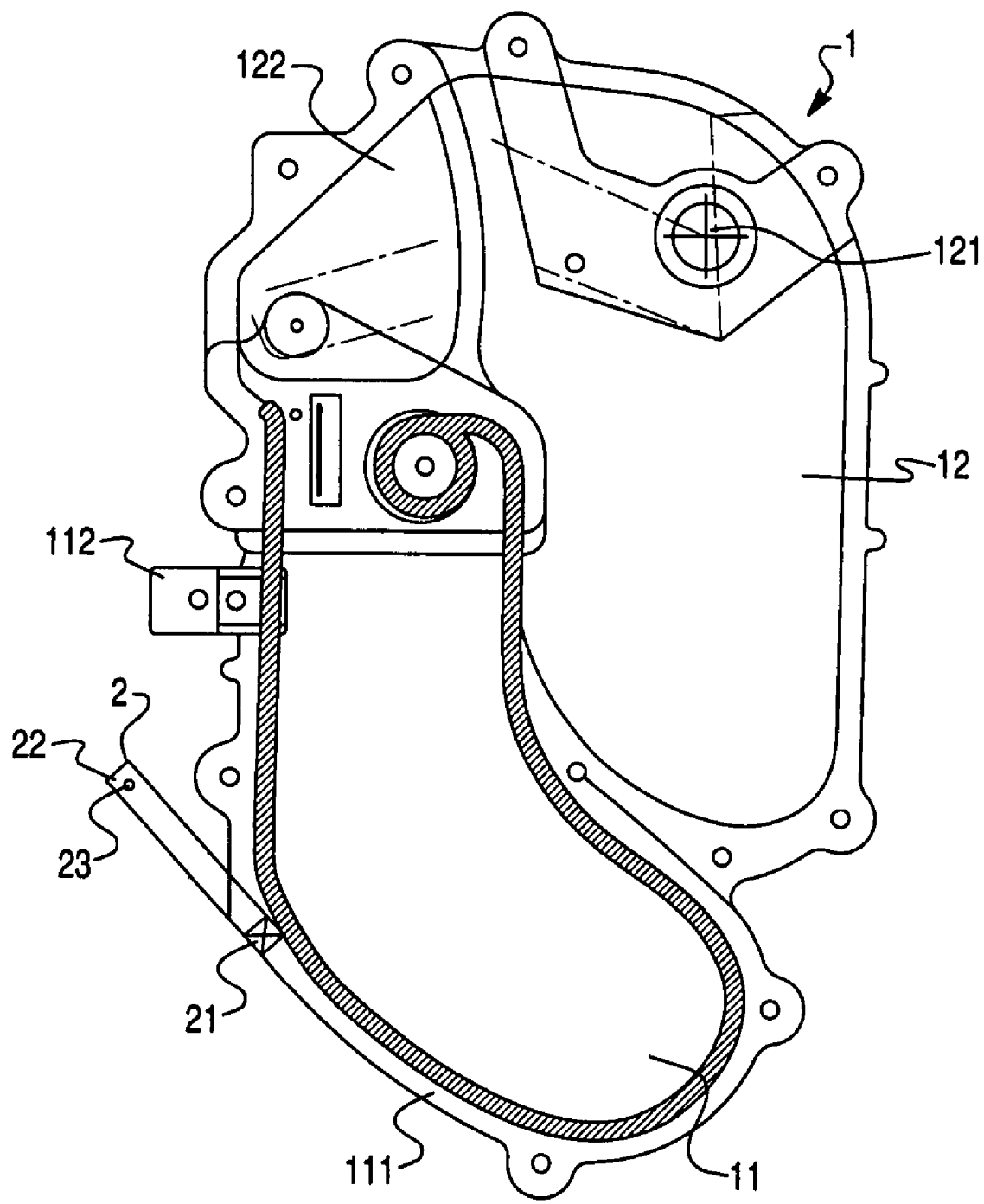
FIG. 1 shows a first embodiment of a side airbag with a functional band.

According to an exemplary embodiment, a side airbag arrangement with an inflatable airbag can be configured to position the deployed airbag in a vehicle more accurately than hitherto.

Accordingly, in an embodiment, a side airbag arrangement is provided having an airbag which is provided for the protection of a vehicle occupant and which has at least two inflatable chambers which are in each case to assume a specific position in a motor vehicle after inflation. Furthermore, a functional band is provided, which is secured by a portion outside the airbag and which, by use of another portion, exerts on at least one of the chambers of the airbag a holding force which has the effect that the chamber, after inflation, assumes the position provided for it.

The functional band allows a directed positioning of one of the airbag chambers, with the result that the protective action of the airbag as a whole is increased. In this case, the functional band is fastened by a portion outside the airbag, that is to say it does not connect chambers of the airbag to one another, but a chamber of the airbag to the vehicle. Chambers of the airbag are understood in this context to mean not only various inflatable sections of an airbag, but also separate inflatable elements (connected to one another) which together form an airbag.

In an embodiment, after the deployment of the airbag, a first chamber of the airbag extends, at least in portions, underneath the other chambers with respect to the vertical vehicle axis, and the functional band exerts the holding force on the first chamber.

By this configuration of the side airbag arrangement, a directed positioning of the first (lower) chamber of the airbag with respect to the vehicle occupant to be protected is possible. In particular, the functional band exerting the holding force may be designed and attached such that it to some extent "retains" the chamber during deployment, so that the situation is avoided where the inflated chamber folds over too far in the direction of the vehicle occupant or is pulled by a further chamber of the airbag upwards or in front of a body region of the vehicle occupant, for the protection of which the first chamber is not at all designed.

The functional band must have a sufficient tearing resistance, so that, during deployment, it reliably retains the airbag chamber and does not tear due to a tensile force acting during the deployment of the airbag. It may be formed, for example, from a plastic or a textile fabric, although the use of a textile fabric would make it possible to stitch the functional band to the airbag.

In a particularly preferred embodiment of the side airbag, the first chamber is designed to protect the pelvic region of the vehicle occupant. The functional band can (that is to say, the holding force exerted by the functional band on the chamber) prevent the situation where, after deployment, the pelvic chamber extends completely or with a portion in the region of the thorax or level with the thorax of the vehicle occupant. In addition, there may be provision for assigning a second chamber of the side airbag to the thorax region and additionally a third chamber to the head region of the vehicle occupant.

Since the pelvic region of a vehicle occupant can be subjected to greater load in biomechanical terms than the thorax region located above the pelvic region, the pelvic chamber is designed such that it has an internal pressure which is higher than the internal pressure in the chamber (thorax chamber) assigned to the thorax of the vehicle occupant. The situation must therefore be avoided where, during the deployment of the airbag, the pelvic chamber comes into the rib region of the vehicle occupant and this possibly impinges with part of the rib region onto the pelvic chamber filled with high pressure, not onto the thorax chamber filled with a lower pressure.

This can be achieved, according to an embodiment, since the pelvic chamber can be positioned in a directed manner via the functional band. The pelvic chamber is retained by the functional band such that, on the one hand, it does not come into the rib region of the vehicle occupant, but, on the other hand, it assumes a position which affords optimal protection of the pelvic region of the vehicle occupant.

In an advantageous development of an embodiment, the functional band is fastened to the first chamber of the airbag, that is to say, for example, to the pelvic chamber of the airbag. The first chamber may be delimited here, for example, by a marginal region, and a portion of the functional band may be fastened to this marginal region, for example by adhesive bonding or stitching.

In order to achieve a directed retention of the first (lower) chamber of the side airbag, it may be expedient to fasten the functional band on sides of the airbag in the lower region (with respect to the vertical vehicle axis) of the first chamber. This, however, is not mandatory; the actual type of connection of the functional band to the airbag is selected according to the requirements. It is essential merely that the first chamber of the airbag assumes the desired position after deployment.

Furthermore, there is preferably provision for connecting a plurality of portions of the functional band to the airbag. This makes it possible, on the one hand, to have a particularly stable connection of the functional band to the airbag; on the other hand, a directed control of the deployment of the airbag can take place via the position of the connection points. For example, the airbag can be additionally tautened if the various connecting portions of the functional band are connected to various airbag portions. As a result, in addition to the positioning of the first chamber, a directed shaping of the inflated airbag is possible, depending on the type of installation or use of the airbag. As mentioned, it is, of course, also possible for only one portion (for example, one end) of the functional band to be fastened to the airbag.

So that the functional band can exert a holding force on a chamber of the airbag (for example, the lower chamber), that portion of the functional band which is fastened outside the airbag is advantageously fastened to a vehicle part. At the same time, for example, another portion of the functional band is connected to a chamber of the airbag or else to another portion of the airbag. It is in any event necessary, however, to ensure that a holding force emanates from the functional band to a chamber of the airbag, which may even be the case when the functional band is connected to the airbag outside the chamber.

That portion of the functional band which is secured outside the airbag may be fastened, for example, to a part of the vehicle seat, of an airbag module (either to the airbag module to which the airbag belongs or to a further airbag module) or of the vehicle body.

The position of the deployed chamber can be set via the length of the functional band and its arrangement with respect to the airbag (that is to say with respect to the location of its fastening to the airbag, on the one hand, and the fastening point on a vehicle part, on the other hand).

In an advantageous embodiment, the functional band is of multi-ply design and may in this case form, in particular, a loop or a pocket. Where the loop is concerned, for example, the two loose ends are fastened one above the other to the airbag, while the closed end of the loop forms the free end of the functional band, and the functional band thus forms a kind of "grip" on the airbag. In principle, however, the geometry of the functional band is freely selectable and depends, inter alia, on the actual configuration of the airbag.

Furthermore, an additional functional band may be provided, which connects at least two portions (for example, two chambers) of the airbag to one another. This allows an exact positioning of two portions of the airbag with respect to one another. How far additional functional bands are required or expedient depends on the surroundings of the mounted airbag and on its actual configuration or that of the airbag module surrounding the airbag.

In a further embodiment for fastening the functional band to the airbag, the functional band runs, at least in portions, inside the airbag. This may be implemented, on the one hand, such that the airbag has a turned-in piece in which runs an end portion of the functional band which is connected to the airbag in the turned-in piece. On the other hand, "inside" may also mean that the functional band projects with a portion into the airbag interior via an orifice in the airbag wall and is fastened to a portion of the inner face of the airbag. The design of the airbag must in this case take into account the fact that gas is able to emerge outwards via the orifice in the airbag wall.

In a further embodiment, the functional band has a seam which connects at least two portions of the functional band to one another so as to shorten the effective length of the functional band and which is designed such that it tears during the deployment of the airbag. As a result, for example, it becomes possible for the airbag to be folded together compactly, without the effective length of the functional band having to be shortened. Additionally or alternatively, the functional band is designed such that it is filled with gas during the inflation of the airbag, with the result that the rigidity of the functional band and consequently of the side airbag as a whole is increased.

The functional band is stitched or otherwise connected at one end to the airbag, but may also be produced in one piece with the airbag. This is due to the fact that the functional band is produced at the same time as the production of the airbag blank.

In a particularly preferred design of an embodiment of the side airbag arrangement, a gas generator is included for inflating the airbag. The side airbag arrangement also includes a holding device, such as a bracket, for fastening the gas generator to part of the vehicle seat or of the vehicle body.

Preferably, the holding device has a fastening portion, via which it can be connected to part of the vehicle seat or of the vehicle body. The fastening portion may be, for example, of longitudinally extended design and constitutes a separate part connectable to a further component of the holding device.

In an advantageous version regarding the fastening of the functional band to a vehicle part, a portion, in particular a free end, of the functional band is fastened, in particular screwed, together with the fastening portion, to part of the vehicle seat or of the vehicle body. In this case, one end (the fixed end) of the functional band is connected firmly to the side airbag, while, for example, the other end of the functional band (opposite the end connected to the airbag) is connected to the vehicle. It is also possible, in an embodiment, for a middle portion of the functional band to be connected to the airbag, with the result that the band would have two free ends, one or both of which is or are connected to the vehicle.

In a further preferred embodiment for fastening the functional band to a vehicle part, the fastening portion is connected to a further part of the holding device via a bolt, and a portion of the functional band is fastened (together with the fastening portion) to the bolt. The functional band is therefore fastened by a portion (for example, a free end) to the fastening portion of the holding device, and not directly to a vehicle part. The restraining action (that is to say, the retention of the first (lower) airbag chamber) can also be achieved in this embodiment.

Furthermore, a portion of the functional band may be designed as a loop which is suspended on the fastening portion of the holding device. The holding device here passes with the fastening portion through the loop, with the result that the latter is fixed (suspended) on it. The fastening portion is, in particular, of longitudinally extended design and has an end portion which bends away from the airbag and on which the loop of the functional band is suspended. This additionally prevents the suspended functional band from slipping off from the holding device.

In another embodiment, the airbag is an integral part of an airbag module which is surrounded by a module cover, a portion of the functional band being fastened to the module cover. Preferably, the module cover has an first part and a second part, after the mounting of the airbag module in the back-rest of a vehicle seat the first part facing a side face of the back-rest, while the second part faces away from the side face, and a portion of the functional band being connected to the second part. In a preferred design, the second part of the module cover has a fastening strap (formed, for example, in one piece with the module cover) on which a portion of the functional band is suspended.

In another embodiment, a side airbag arrangement for a vehicle occupant restraint system is provided, having an inflatable airbag, a gas generator for inflating the airbag and a holding device, via which the gas generator can be connected to part of a vehicle seat or of a vehicle body, the airbag having at least one connecting structure for the connection of the airbag to the holding device. The connecting structure is provided on a functional band fastened to the airbag.

In a preferred embodiment, the functional band has at least two connecting structures for connection to the holding device, and selectively in each case only one of the connecting structures is to be connected to the holding device. The connecting structures are designed and provided such that the shape which the airbag has after deployment depends on which of the connecting structures is connected to the fastening mechanism.

A simple adaptation of the airbag to specific requirements is thereby possible, for example to the type of airbag module or of the seat into which the airbag is to be integrated. In the case of two connecting structures, a selection can be made between two different airbag variants (that is to say, shapes of the deployed airbag), the desired variant being defined by the fastening of the holding device to a specific connecting structure (corresponding to the desired airbag variant) of the available connecting structures of the functional band. In a preferred embodiment, the functional band is arranged along a surface of the airbag.

For example, chambers of the airbag can be adapted exactly to specific body regions, without this adaptation having to take place even during the production of the airbag. This simplifies the airbag production, since initially the same airbag can be produced for different applications (for example, different vehicle types in which the airbag is to be used). Adaptation takes place only during mounting, by the fastening means being connected to a specific connecting structure.

It would be appreciated that the embodiments are not restricted to two connecting structures. In principle, any desired number of such connecting structures may be provided. Their number depends on the configuration of the airbag and on its intended use.

The holding device advantageously, in an embodiment, has a longitudinally extended fastening portion for connecting the holding device to part of a vehicle seat or of a vehicle body which extends parallel to the loops.

The shape of the airbag can mean, in particular, its external geometry (or the geometry of individual airbag chambers). In particular, the volume of the airbag may vary, depending on the airbag shape. The volume which the airbag occupies after deployment may therefore depend on which of the connecting structures present is connected to fastening means.

A preferred embodiment provides for the connecting structures of the functional band to be of loop-shaped or pocket-shaped design. In particular, the functional band has, as connecting structures, loops which are formed transversely to its longitudinal direction and through which the fastening portion of the holding device can be led. A connecting loop is therefore suspended on the fastening portion and thus fastened to it. Suspension takes place, for example, such that the functional band is to some extent tensioned, so that it does not slip off from the holding device.

Preferably, the loops extend, in the lead-through direction, over the entire width of the functional band and are formed, for example, by seams running transversely with respect to the longitudinal direction of the functional band. Wide loops of this type make it possible to have a reliable connection to the holding device (or to the fastening portion of the holding device), since it becomes additionally more difficult for it to slip out of the holding device. The functional band may be, for example, multi-ply and be stitched along its longitudinal sides to the airbag between the loops.

In an advantageous development, the fastening portion of the holding device has an end which is designed so as to be angled away from the airbag and thus additionally prevents a functional band suspended on the fastening portion from slipping off.

Embodiments are explained in more detail below with reference to the figures.

FIG. 1 illustrates a side airbag 1 in the inflated state, which has two chambers 11, 12. The chambers 11, 12 of the airbag 1 are assigned to different body regions of a vehicle occupant which are to be protected: the chamber 11 (pelvic chamber) extending beneath the chamber 12 with respect to the vertical vehicle direction protects the pelvic region of the vehicle occupant, and the thorax chamber 12 arranged above the pelvic chamber 11 protects the thorax and head region of the vehicle occupant. A portion of the thorax chamber 12 which extends in the region of transition to the pelvic chamber 11 is provided with a reinforcing ply 122, in order to protect this region of the airbag from a (hot) gas stream flowing out from a gas generator (not illustrated) for the inflation of the airbag.

The respective internal pressures of the chambers are in this case different and are adapted to the body region to be protected in each case; the internal pressure in the thorax chamber 12 is lower than the pressure in the pelvic chamber 11, since the thorax region of a human can be subjected to less load in biomechanical terms than the pelvic region. For pressure adaptation, the thorax chamber 12 has a ventilation orifice 121 which discharges again part of the gas flowing into the chamber 12, with the result that a lower internal pressure is established.

The pelvic chamber 11, bent in the form of a boot in the forward direction of travel, is connected in the lower region (for example, in the region of the "boot heel") to a functional band in the form of a catch band 2. In this case, a portion 21 of the catch band 2 is stitched to a portion of a marginal region 111 of the airbag 1, the said marginal region surrounding the pelvic chamber 11. The portion 21 forms one end of the catch band 2. A portion, spaced apart from the stitched end 21, of the catch band 2 can be connected to part of the vehicle body (or to part of a vehicle seat or part of the side airbag module to which the side airbag 1 belongs). In particular, fastening may take place at the free end 22 of the catch band 2, the said free end having a fastening orifice 23 for this purpose.

By the free end 22 of the catch band 2 being connected to a vehicle part, the inflated pelvic chamber 11 is positioned in relation to the vehicle occupant to be protected by the side airbag, that is to say is retained to an extent such that it is not folded over too far in the direction of the vehicle occupant to be protected or is not pulled by the thorax chamber 12 into the rib region of the vehicle occupant to be protected.

As mentioned, the rib region of a vehicle occupant can be subjected to less load in biomechanical terms than the pelvic region, and therefore the thorax chamber 12 is filled with lower pressure than the pelvic chamber 11. If, then, the pelvic chamber 11 is folded into the rib region of the vehicle occupant during inflation, this body region would impinge at least partially onto the pelvic chamber, and not onto the thorax chamber, as intended. The thorax region of the vehicle occupant would thereby be subjected to too high a load in biomechanical terms upon impact. This is prevented by the pelvic chamber 11 being retained by the catch band 2.

In the configuration of FIG. 1, the catch band 2 is of essentially rectangular design and has a plurality of material plies of a textile fabric. However, the geometry of the catch band is, of course, not restricted to this configuration; the geometry of the catch band is configured according to the actual embodiment of the airbag or of the airbag module.

The airbag 1 additionally has at the marginal region 111 a strap 112, the free end of which can be folded over onto the airbag and be connected to this, so that a loop is obtained. A holding device (bracket), which serves for holding a gas generator (not illustrated), can be led through this loop, as a result of which an alignment of the airbag takes place at the same time via the holding device.

Figure 2A:
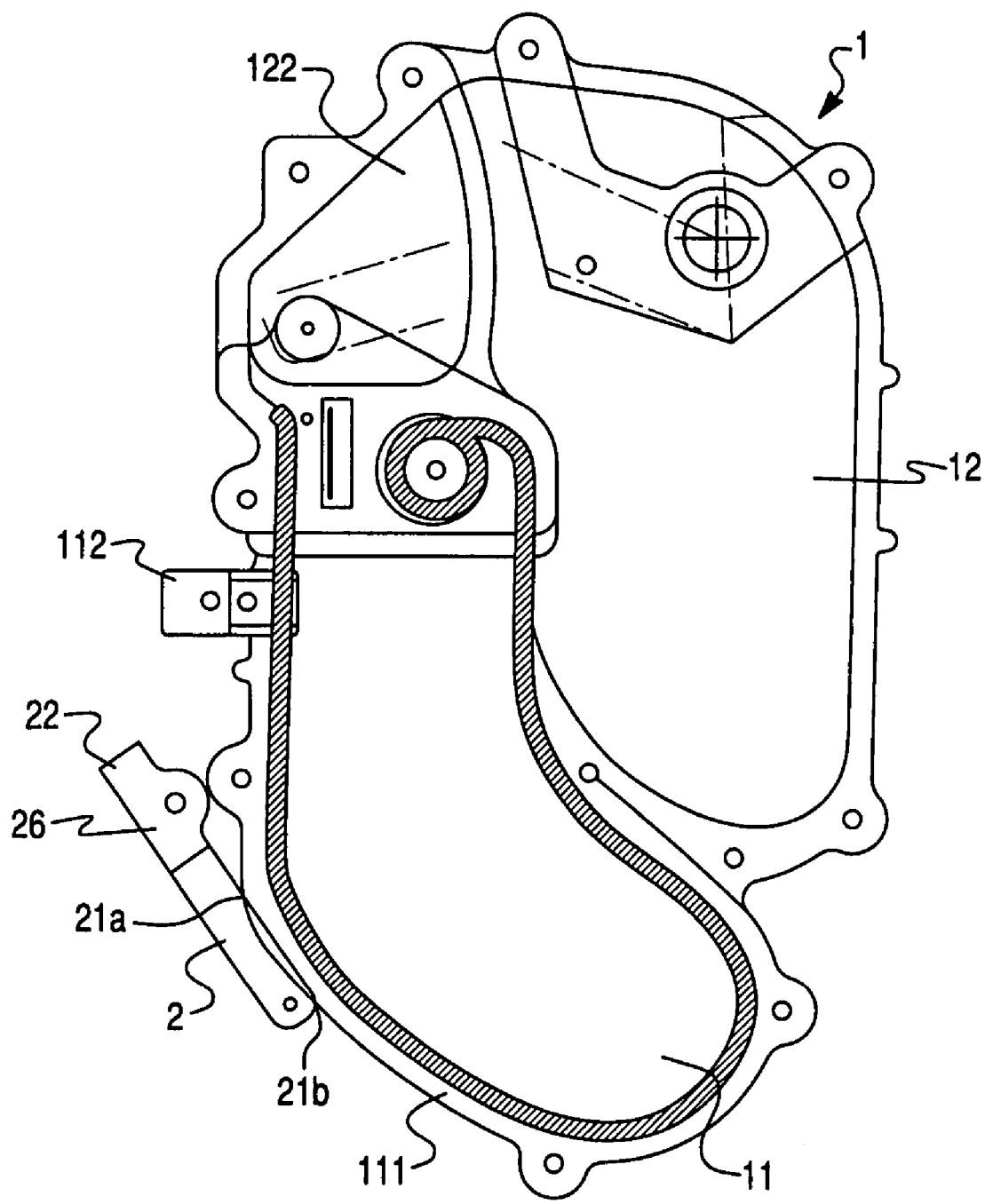
FIGS. 2A and 2B show a second embodiment of a side airbag with a functional band.
Figure 2B:
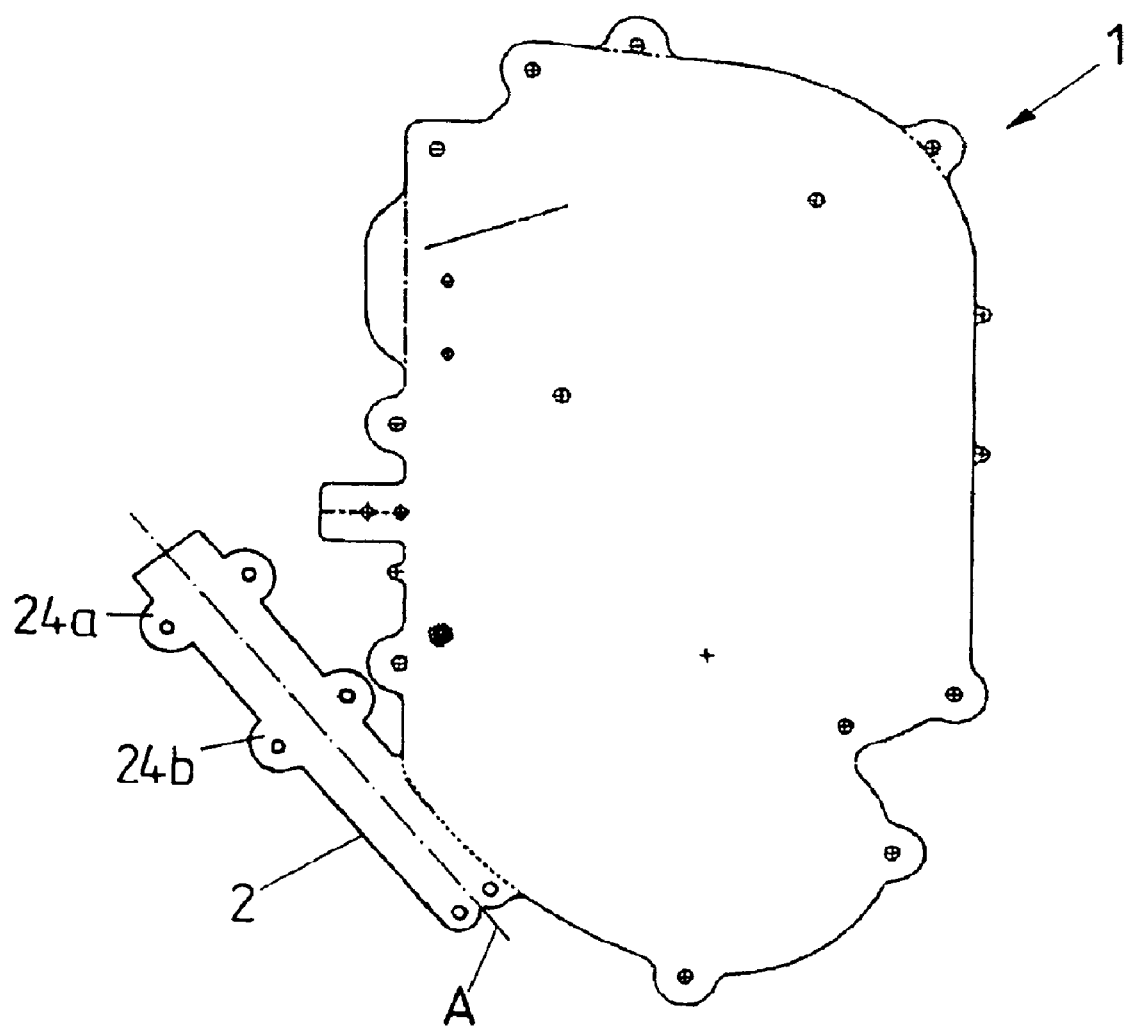

FIGS. 2A and 2B show a side airbag 1 which corresponds in terms of construction to the side airbag 1 of FIG. 1. A pelvic chamber 11 has fastened to it a catch band 2 which serves for positioning the inflated pelvic chamber 11. In contrast to the catch band of FIG. 1, the catch band of FIGS. 2A and 2B is fastened by means of two portions 21a, 21b to a marginal region 111, surrounding the pelvic chamber 11, of the side airbag 1, not only by means of one portion, as in FIG. 1.

The catch band 2 of FIGS. 2A and 2B is likewise of multiply design. FIG. 2B (which illustrates the outline of the deployed side airbag) shows the "swung-open" state of the catch band 2 which has two strap portions 24a, 24b. The swung-open catch band 2 is folded, on the one hand, along its longitudinal axis of symmetry A. On the other hand, the free end of the (swung-open) catch band is folded and fastened to the catch band such that the outer strap portion 24a coincides with the strap portion 24b. This gives rise to a loop 26, via which the catch band 2 can be suspended on a vehicle part.

FIGS. 3A to 3C show a first variant for fastening a portion of a catch band 2, connected to a pelvic chamber 11 of a side airbag 1, to a vehicle part. As in the previous figures, the catch band 2 is firmly stitched at one end 21 to a portion of a marginal region 111 of the pelvic chamber 11. Another portion 22 (the free end) of the catch band 2 is screwed to part of the vehicle body by means of a screw 25.

It can be seen in FIG. 3B that a strap 112 formed at the margin of the chamber 11 forms a loop through which a longitudinally extended fastening plate 52 of a holding device 5 (bracket) for a gas generator is led. The holding device 5 serves for connecting a gas generator (not illustrated) to a vehicle part. The fastening plate 52 constitutes a fastening portion of the holding device 5, but is produced as a separate part.

One end 51 of the fastening plate 52 is angled and is connected at a screwing point 50 to a vehicle part 9 (part of a vehicle seat or vehicle body). The free end 22 of the catch band 2 is screwed, together with the end 51 of the fastening plate 52, at the screwing point 50 and is thus connected firmly to the vehicle part.

In FIG. 3C, as in FIG. 3B, the free end 22 of the catch band 2 is screwed, together with a fastening plate 52 of a holding device 5, at a screwing point 50. In addition, a lower part 6 of a module cover for covering an airbag module to which the airbag 1 belongs is arranged. The lower part 6 of the module cover covers one side of the airbag module and, in the case of an airbag module installed in a vehicle seat, points into the interior of the seat. The part 6 has an orifice 61 through which the free end 22 of the catch band 2 is led to the screwing point 50.

Figure 4A:
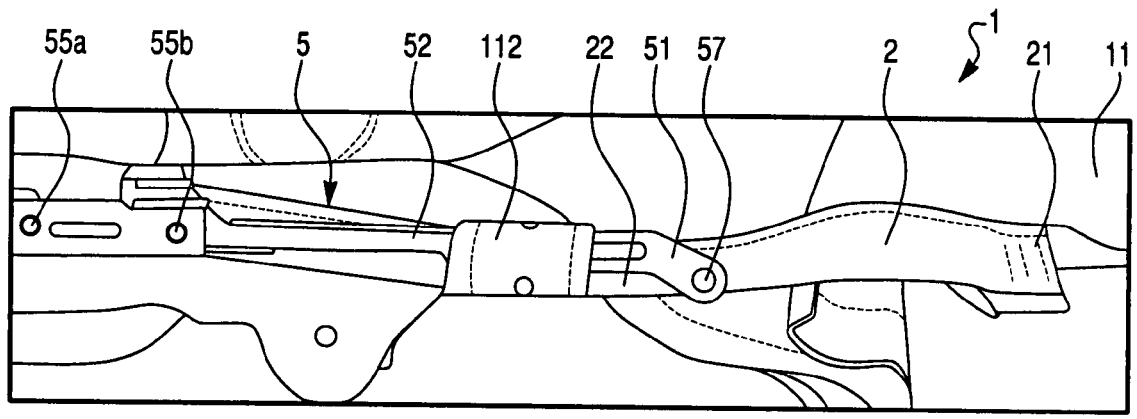
FIGS. 4A and 4B show a second fastening variant.
Figure 4B:
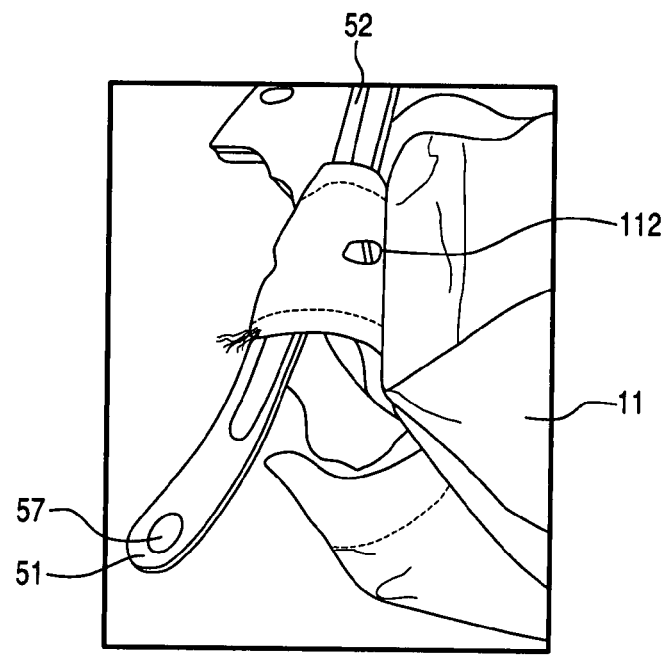

FIGS. 4A and 4B show a second variant for fixing a portion 22 of a catch band 2 to a vehicle part. The airbag 1 or the airbag module to which the airbag 1 belongs has a holding device 5 for a gas generator (not illustrated), the said holding device possessing a fastening plate 52 for connection to a vehicle part. The fastening plate 52 is connected in the region of the gas generator to a further part (clip) of the holding device. The connection takes place via threaded bolts 55a, 55b.

The fastening plate 52 extends through a loop 112 present at the airbag margin and has an angled end 51 with a fastening orifice 57 for fastening the holding device (for example, by means of a screw). The catch band 2 likewise extends from the airbag through the loop 112 and is fastened, together with the fastening plate 52 of the holding device 5, to the front threaded bolt 55a (with respect to the catch band 2). This is shown from another perspective, and enlarged, in FIG. 4B. It would be appreciated, here, that the catch band does not necessarily have to be led through the loop 112, but it is also possible for it to run around the loop.

FIGS. 5A to 5D relate to a third variant for fastening a portion 22 of a catch band 2 to a vehicle part. In this case, the catch band 2 forms a loop, the open ends 21 of which are firmly stitched together on a marginal portion of a pelvic chamber 11. A closed end 22 of the loop-shaped catch band 2 is suspended on one end 51 of a fastening plate 52 of a gas generator holding device, with the result that the catch band 2 (and consequently the pelvic chamber 11) is fixed to the fastening plate 52.

Figure 5C:
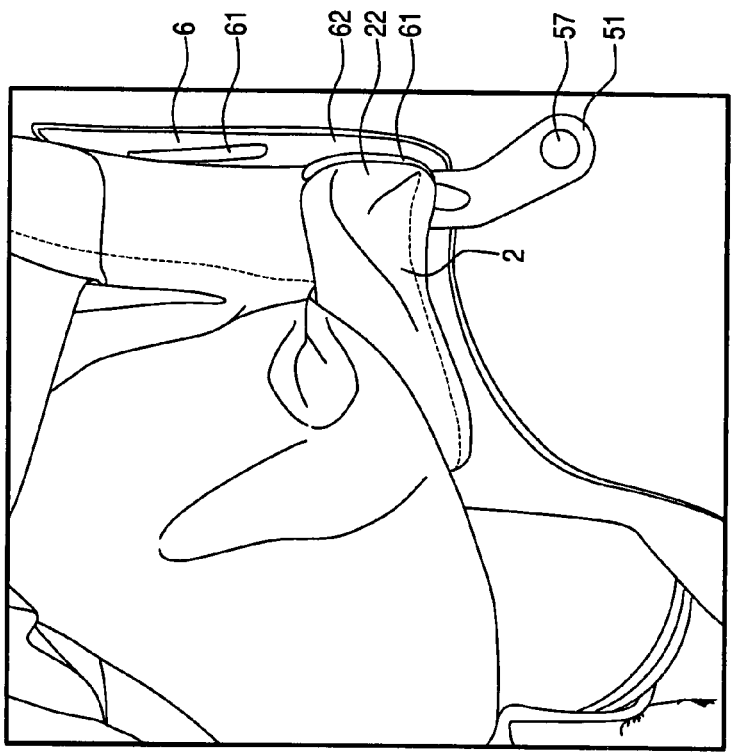
FIGS. 5A-5D show a third fastening variant.
Figure 5A:
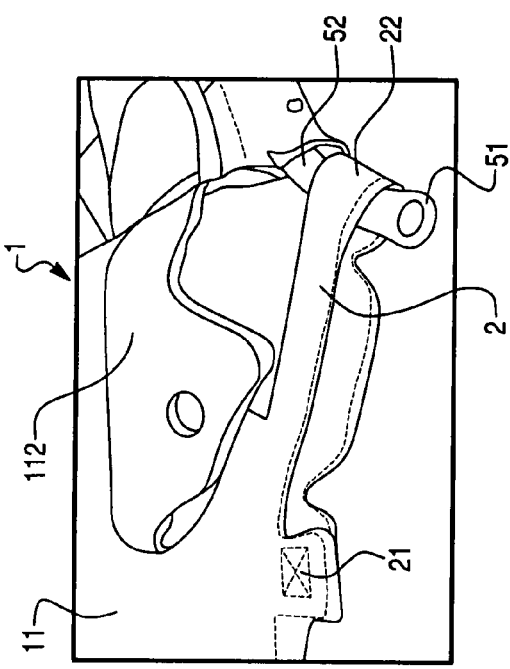
Figure 5B:
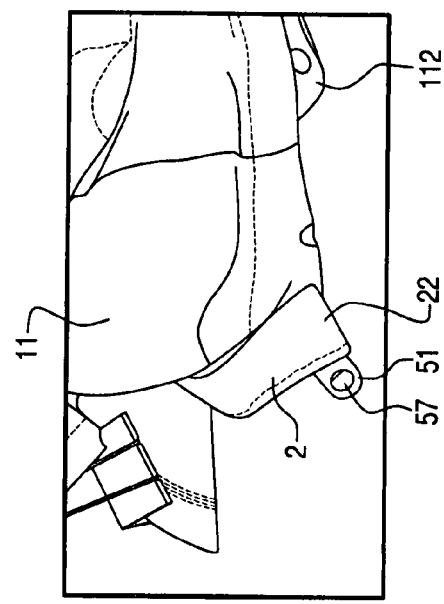

The end 51 of the fastening plate 52 bends away from the airbag 1, so that a slipping-off of the loop-shaped catch band 2 from the fastening plate 52 is avoided and there is a reliable connection between the catch band 2 and fastening plate 52 (cf. FIG. 5C which shows the bending-away end 51 of the fastening plate 52).

According to FIG. 5C in addition, a lower part 6 of a module cover for covering an airbag module to which the airbag 1 belongs is arranged (cf. FIG. 3C). As in FIGS. 5A and 5B the closed end 22 of the catch band 2 is suspended on one end 51 of a fastening plate. The loop of the catch band is covered laterally by a lateral margin 62 of the part 6.

Figure 5D:
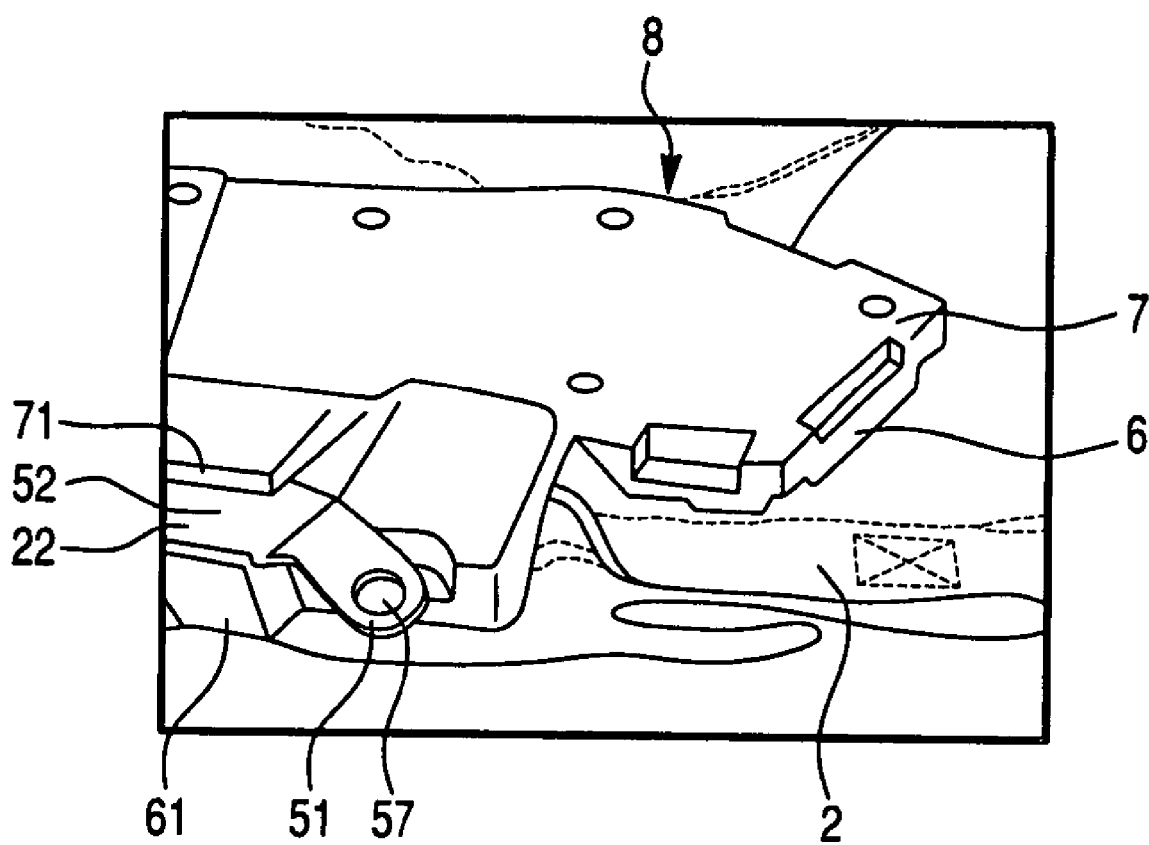

FIG. 5D shows a complete module housing 8 for an airbag module which, in addition to a lower part 6, has an upper part 7 which, when the module is installed in a seat, points towards an outer face of the seat. A fastening plate 52 of a gas generator holding device is introduced between the upper and the lower part 6, 7. In this case, a loop-shaped end 22 of a catch band is laid around an angled end 51 of the fastening plate 52 and is thus connected to the fastening plate 52.

FIGS. 6A and 6B relate to a fourth variant for fastening a portion of a catch band to a vehicle part. In this variant, an end portion 22 of a catch band 2 is fastened to a lower part 6 of a module housing of an airbag module. As already described further above, the lower part 6 covers a side of the airbag module which, when the module is installed in a vehicle seat, faces away from the outer face of the seat. The lower part 6 is firmly connected to the seat, this connection being maintained even during the inflation of the airbag. The end 22 of a catch band 2 has a slot-shaped orifice 23, via which the catch band 2 is suspended on a fastening flap 63 of the lower part 6 of the module housing.

By the free end 22 being suspended on the lower part 6, the catch band 2 is firmly connected to the lower part 6, thus bringing about the desired positioning of the pelvic chamber (not shown in FIG. 6A) of the side airbag. As in the preceding examples, that end of the catch band 2 which lies opposite the free end 22 is in this case connected, for example firmly stitched, to the pelvic chamber of the side airbag.

FIG. 6B shows the lower part 6 in a side view. The lower part 6 has a lateral margin 62 in which the strap 63 for suspending the catch band is formed.

Figure 7A:
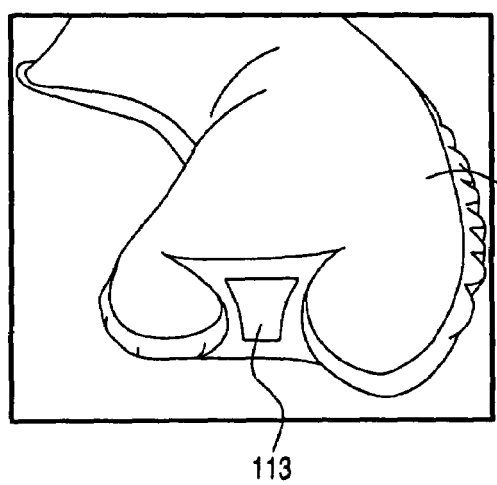
FIGS. 7A and 7B show a variant of the fastening of the functional band to an airbag.
Figure 7B:
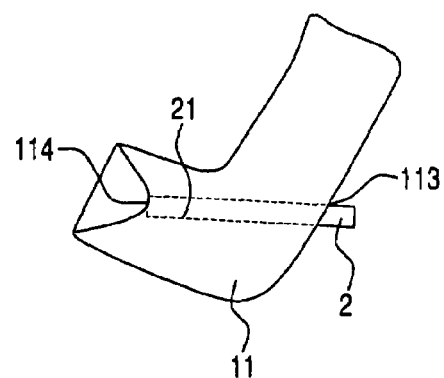

FIGS. 7A and 7B show a variant for fastening a catch band 2 to an airbag chamber 11. One end 21 of the catch band 2 is led into the airbag interior via an orifice 113 of the airbag 11 and is connected, for example stitched, there to a portion 114 of the airbag inner wall.

Figure 8:
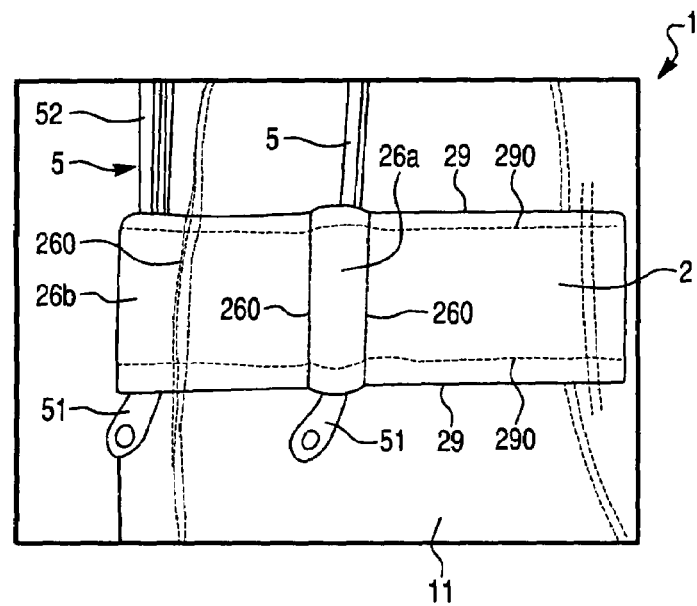
FIG. 8 shows a functional band fastened to an airbag and having connecting loops.

FIG. 8 illustrates a catch band connected to an airbag according to another embodiment. A catch band 2 extends over virtually the entire width of the surface of an airbag chamber 11 and is stitched along its longitudinal sides 29 to an airbag 1 by means of longitudinal seams 290, so that it is fastened firmly to the airbag 1.

The catch band 2 has two loops 26a, 26b as connecting structures which are in each case suspended on an elongate fastening plate 52 of a holding device 5 and are thus connected to the holding device 5. The fastening plate 52 constitutes a fastening portion of the holding device. Depending on which of the loops 26a, 26b the fastening plate 52 is suspended in, the airbag 1 will assume, after inflation, a specific shape which depends on the position of the connecting loop 26a or 26b on the airbag. The loops can be formed, in an embodiment, by seams 260, such as shown in FIG. 8.

The fact that the fastening plate can be led both through one and through the other loop 26a and 26b is illustrated in FIG. 8 in that two fastening plates 5 which are in each case suspended in a loop 26a, 26b are arranged. However, in an embodiment, an airbag module only has one fastening plate which can be suspended selectively either in the loop 26a or in the loop 26b.

If, for example, the fastening plate 52 was suspended in the loop 26b lying further outwards, an airbag with a larger volume would be obtained, since the chamber 11 to which the catch band 2 is fastened could be inflated, unimpeded, and completely. If, however, the fastening plate 52 is suspended in the loop 26a arranged further inwards with respect to the airbag chamber 11, the volume in the upper region of the airbag chamber 11 is reduced. Thus, by selecting the loop in which the fastening plate 52 is suspended, the geometry and volume of the deployed airbag can be varied and adapted to a specific use of the airbag.

Figure 9:
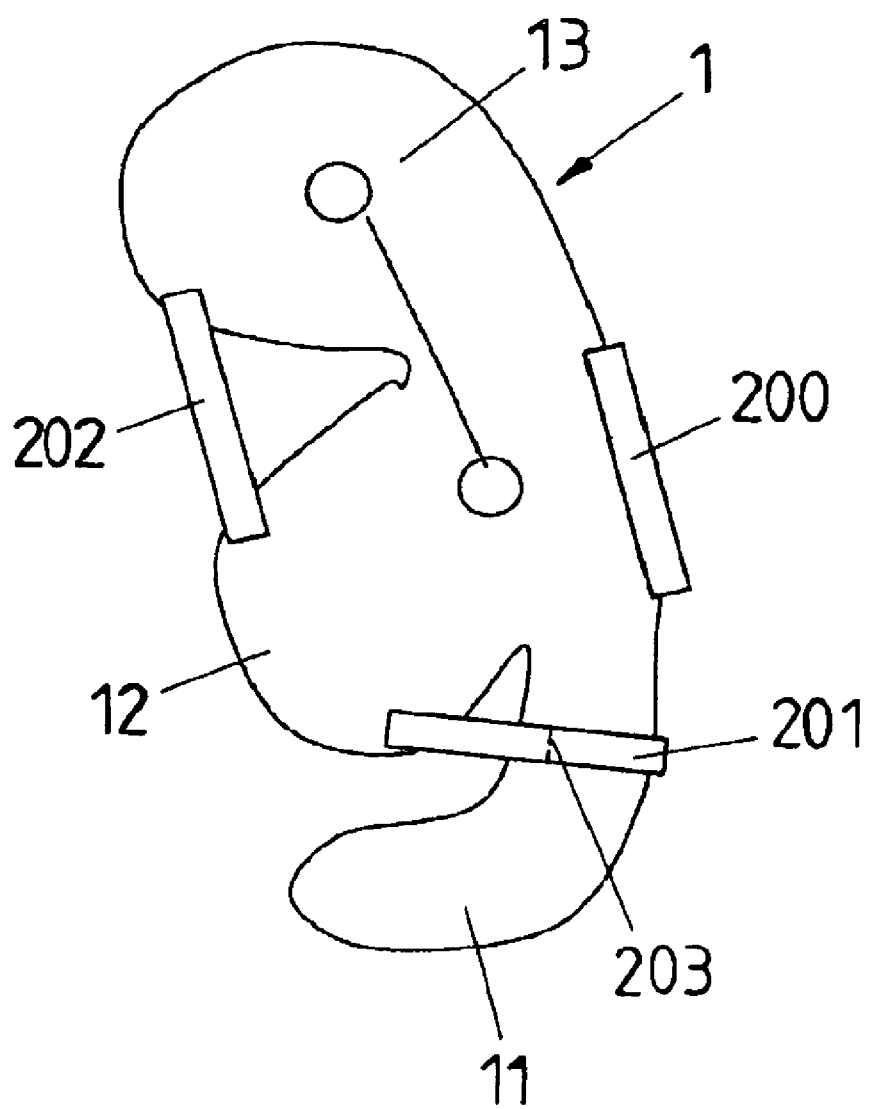
FIG. 9 shows an airbag with additional functional bands.

FIG. 9 shows an airbag 1 with a pelvic and a thorax chamber 11, 12 and with an additional head chamber 13. The airbag 1 has functional bands 200, 201, 202 which are attached additionally to a catch band (not illustrated) which fixes the pelvic chamber 11 of the airbag 1. The functional bands 201, 202 are in this case arranged between various chambers 11, 12 and 12, 13 of the airbag 1, with the result that these chambers are positioned with respect to one another during and after deployment. The catch band 200 is arranged (opposite the chamber 12) on a portion of the side airbag 1 which is at the rear, as seen in the forward direction of travel of the vehicle, and serves for stabilizing the inflated airbag. The functional band 201 has a seam schematically shown at 203 which connects at least two portions of the functional band 201 to one another so as to shorten the effective length of the functional band 201 and which is designed such that it tears during the deployment of the airbag 1.

The priority application, German Patent Application No. DE 20 2006 010 362.7 filed Jun. 29, 2007, including the specification, drawings, claims and abstract is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. Side airbag arrangement for a vehicle occupant restraint system, comprising:
    an airbag which is provided to protect a vehicle occupant, the airbag including at least two inflatable chambers which are in each case to assume a specific position in a motor vehicle after inflation;
    a functional band which is fastened by a portion outside the airbag, the functional band being configured to exert on at least one of the chambers of the airbag a holding force such that the chamber, after inflation, assumes a predetermined position provided for the chamber; and
    a holding device to connect a gas generator to part of a vehicle seat or vehicle body,
    wherein the holding device includes a fastening portion to connect the holding device to part of the vehicle seat or of the vehicle body, and
    wherein a portion of the functional band is fastened, together with the fastening portion of the holding device, to part of the vehicle seat or the vehicle body.

2. Side airbag arrangement according to claim 1, wherein, after the deployment of the airbag, a first chamber of the airbag extends, at least in portions, underneath at least one further chamber with respect to the vertical vehicle axis, and the functional band exerts the holding force on the first chamber.

3. Side airbag arrangement according to claim 2, wherein the first chamber is designed to protect the pelvic region of the vehicle occupant.

4. Side airbag arrangement according to claim 3, wherein the holding force exerted by the functional band on the first chamber prevents the first chamber from extending level with a thorax region of the vehicle occupant.

5. Side airbag arrangement according to claim 1, wherein the functional band is fastened with at least one portion to a first chamber of the airbag.

6. Side airbag arrangement according to claim 1, wherein a plurality of portions of the functional band are connected to the airbag.

7. Side airbag arrangement according to claim 1, wherein that portion of the functional band which is fastened outside the airbag is fastened to part of the vehicle seat or the vehicle body.

8. Side airbag arrangement according to claim 1, wherein the airbag includes a second chamber which extends above a portion of a first chamber and which is configured to protect to a thorax region of the vehicle occupant.

9. Side airbag arrangement according to claim 8, wherein the airbag includes a third chamber which extends above the first chamber and which is configured to protect a head region of the vehicle occupant.

10. Side airbag arrangement according to claim 1, wherein the chambers of the airbag have different internal pressures after inflation.

11. Side airbag arrangement according to claim 1, wherein a first chamber is delimited by a marginal region, and a portion of the functional band is fastened to the marginal region.

12. Side airbag arrangement according to claim 1, wherein the functional band is stitched or adhesively bonded to the airbag.

13. Side airbag arrangement according to claim 1, wherein the functional band forms a loop.

14. Side airbag arrangement according to claim 1, further comprising at least one additional functional band which connects at least two portions of the airbag to one another.

15. Side airbag arrangement according to claim 1, wherein at least a portion of the functional band extends inside the airbag.

16. Side airbag arrangement according to claim 1, wherein the functional band includes a seam which connects at least two portions of the functional band to one another so as to shorten the effective length of the functional band, and the seam is configured to tear during deployment of the airbag.

17. Side airbag arrangement according to claim 1, wherein the functional band is produced in one piece with the airbag.

18. Side airbag arrangement according to claim 1, wherein the fastening portion is of a longitudinally extended design.

19. Side airbag arrangement according to claim 1, wherein a portion of the functional band is a loop which is suspended on the fastening portion of the holding device.

20. Side airbag arrangement according to claim 19, wherein the fastening portion includes an end portion which bends away from the airbag and on which the loop of the functional band is suspended.

21. Side airbag arrangement according to claim 1, wherein the airbag is an integral part of an airbag module which is surrounded by a module cover, and a portion of the functional band is fastened to the module cover.

22. Side airbag arrangement according to claim 21, wherein the module cover includes an first part and a second part, after the mounting of the airbag module in a back-rest of a vehicle seat, the first part faces a side face of the back-rest, the second part faces away from the side face, and a portion of the functional band is connected to the second part.

23. Side airbag arrangement according to claim 22, wherein the second part of the module cover includes a fastening strap on which a portion of the functional band is suspended.

24. Side airbag arrangement for a vehicle occupant restraint system, comprising:
an airbag which is provided to protect a vehicle occupant, the airbag including at least two inflatable chambers which are in each case to assume a specific position in a motor vehicle after inflation;
a functional band which is fastened by a portion outside the airbag, the functional band being configured to exert on at least one of the chambers of the airbag a holding force such that the chamber, after inflation, assumes a predetermined position provided for the chamber; and
a holding device to connect a gas generator to part of a vehicle seat or vehicle body,
wherein the holding device includes a fastening portion to connect the holding device to part of the vehicle seat or of the vehicle body, and
wherein the fastening portion is connected to a further holding part via a bolt, and a portion of the functional band is fastened to the bolt.

25. Side airbag arrangement for a vehicle occupant restraint system, comprising:
an inflatable airbag;
a functional band; and
a holding device for holding a gas generator,
wherein the functional band is fastened to the airbag, the functional band comprising at least one connecting structure for the connection of the airbag to the holding device,
wherein the connecting structure of the functional band is of loop-shaped design.

26. Side airbag arrangement according to claim 25, wherein the functional band includes at least two connecting structures suitable for connection to the holding device, selectively only one of the connecting structures is to be connected to the holding device, and the connecting structures are configured such that the shape which the airbag has after deployment depends on which of the connecting structures is connected to the holding device.

27. Side airbag arrangement according to claim 25, wherein the functional band is arranged along a surface of the airbag.

28. Side airbag arrangement according to claim 25, wherein the holding device includes a longitudinally extended fastening portion for connecting the holding device to part of a vehicle seat or of a vehicle body.

29. Side airbag arrangement according to claim 28, wherein the functional band at least two connecting structures, the connecting structures being loops which are formed transversely to the longitudinal direction of the functional band such that the fastening portion of the holding device can be led through either one of the loops.

30. Side airbag arrangement according to claim 29, wherein the fastening portion extends approximately parallel to loops of the functional band.

31. Side airbag arrangement according to claim 29, wherein the loops extend in the lead-through direction over the entire width of the functional band.

32. Side airbag arrangement according to claim 29, wherein the functional band is multi-ply and is stitched along its longitudinal sides to the airbag between the loops.

33. Side airbag arrangement according to claim 29, wherein the loops are formed by seams extending transversely with respect to the longitudinal direction of the functional band.

34. Side airbag arrangement according to claim 28, wherein one end of the fastening portion of the holding device is angled away from the airbag and is configured to prevent the functional band suspended on the fastening portion from slipping off.

35. Side airbag arrangement according to claim 25, wherein a volume which the airbag occupies after deployment depends on which connecting structure is connected to the holding device.

* * * * *